US011986440B2

(12) United States Patent
Marici et al.

(10) Patent No.: US 11,986,440 B2
(45) Date of Patent: May 21, 2024

(54) PIERCING MEMBER FOR VIAL ADAPTER

(71) Applicant: Becton Dickinson and Company Limited, Dun Laoghaire (IE)

(72) Inventors: Paul Paia Marici, Piscataway, NJ (US); Weston F. Harding, Lehi, UT (US)

(73) Assignee: Becton Dickinson and Company Limited, Dun Laoghaire (IE)

( * ) Notice: Subject to any disclaimer, the term of this patent is extended or adjusted under 35 U.S.C. 154(b) by 819 days.

(21) Appl. No.: 17/056,657

(22) PCT Filed: Jun. 17, 2019

(86) PCT No.: PCT/US2019/037471

§ 371 (c)(1),
(2) Date: Nov. 18, 2020

(87) PCT Pub. No.: WO2019/245962

PCT Pub. Date: Dec. 26, 2019

(65) Prior Publication Data

US 2021/0205174 A1 Jul. 8, 2021

Related U.S. Application Data

(60) Provisional application No. 62/686,144, filed on Jun. 18, 2018.

(51) Int. Cl.
*A61J 1/20* (2006.01)

(52) U.S. Cl.
CPC ............. *A61J 1/201* (2015.05); *A61J 1/2048* (2015.05); *A61J 1/2072* (2015.05); *A61J 1/2096* (2013.01); *A61J 1/2055* (2015.05)

(58) Field of Classification Search
CPC ........ A61J 1/2048; A61J 1/201; A61J 1/2072; A61J 1/2096; A61J 1/2055
See application file for complete search history.

(56) References Cited

U.S. PATENT DOCUMENTS 4,058,121 A 11/1977 Choksi et al.
5,411,499 A 5/1995 Dudar et al.
(Continued)

FOREIGN PATENT DOCUMENTS

EP 2095841 A1 9/2009
JP H1119186 A 1/1999
(Continued)

*Primary Examiner* — John Kim
(74) *Attorney, Agent, or Firm* — The Webb Law Firm

(57) ABSTRACT

A vial adapter includes a body having a component connection interface and a vial connection interface, with the component connection interface configured to engage a connection interface of a mating component, a pressure equalization assembly including a chamber configured to expand from a first volume to a second volume larger than the first volume, and a piercing member having a first end connected to the body and a second end positioned opposite the first end. The second end of the piercing member includes a piercing point configured to pierce a closure of a vial, with the first and second fluid ports extending from a position intermediate the first and second ends of the piercing member to the second end of the piercing member. The first and second fluid ports and a portion of the piercing member define a V-shaped profile at the second end of the piercing member.

23 Claims, 11 Drawing Sheets

(56) References Cited

U.S. PATENT DOCUMENTS

| | | | |
|---|---|---|---|
| 5,419,777 | A | 5/1995 | Hofling |
| 5,478,328 | A | 12/1995 | Silverman et al. |
| 5,487,337 | A | 1/1996 | Uland |
| 5,776,125 | A | 7/1998 | Dudar et al. |
| 8,361,408 | B2 | 1/2013 | Lynn |
| 8,409,164 | B2 | 4/2013 | Fangrow |
| 8,454,573 | B2 | 6/2013 | Wyatt et al. |
| 8,523,838 | B2 | 9/2013 | Tornqvist |
| 8,545,476 | B2 | 10/2013 | Ariagno et al. |
| 9,919,826 | B2 | 3/2018 | Ivosevic et al. |
| 2009/0057258 | A1 | 3/2009 | Tornqvist |
| 2010/0276034 | A1 | 11/2010 | Gonnelli et al. |
| 2012/0053555 | A1 | 3/2012 | Ariagno et al. |
| 2013/0079744 | A1 | 3/2013 | Okiyama et al. |
| 2013/0228239 | A1 | 9/2013 | Cederschiöld |
| 2014/0296789 | A1 | 10/2014 | El-Mohtar et al. |
| 2017/0065486 | A1 | 3/2017 | Mosler et al. |
| 2017/0157336 | A1 | 6/2017 | Olson et al. |
| 2017/0367931 | A1 | 12/2017 | Eichelkraut et al. |
| 2018/0200147 | A1 | 7/2018 | Sanders |
| 2019/0307645 | A1 | 10/2019 | Marici |

FOREIGN PATENT DOCUMENTS

| | | | |
|---|---|---|---|
| JP | 2011167230 | A | 9/2011 |
| JP | 201696846 | A | 5/2016 |
| JP | 2016531607 | A | 10/2016 |
| WO | 9302724 | A1 | 2/1993 |
| WO | 2005032623 | A1 | 4/2005 |
| WO | 2013130971 | A1 | 9/2013 |
| WO | 2014116602 | A1 | 7/2014 |
| WO | 2015042517 | A2 | 3/2015 |
| WO | 2018083451 | A1 | 5/2018 |

PIERCING MEMBER FOR VIAL ADAPTER

CROSS-REFERENCE TO RELATED APPLICATIONS

This application is the United States national phase of International Application No. PCT/US19/37471 filed Jun. 17, 2019, and claims priority to U.S. Provisional Application Ser. No. 62/686,144, entitled "Piercing Member for Vial Adapter" filed Jun. 18, 2018, the entire disclosures of which are hereby incorporated by reference in their entirety.

BACKGROUND OF THE INVENTION

Field of the Invention

The present invention relates to a device for transferring a fluid to or from a fluid container have a sealing member.

Description of Related Art

Medical drugs and solvents are often supplied in glass or plastic containers, such as vials, bottles, or bags, which are sealed by a rubber, plastic or elastomeric bung, stopper, membrane, or puncturable cap. Such sealing members prevent deterioration or contamination of the drug, allow the contents of a container to be mixed by shaking, and prevent the contents of the container from leaking out and contaminating the surroundings. A cannula or a hollow spike defining a flow channel and an opening that communicates with the flow channel is usually inserted through such a sealing member to supply fluids to the container and to withdraw fluid therefrom.

Conventional devices used for accessing the containers utilize a piercing member that penetrates the sealing member of a container and defines an opening at a distal end of the piercing member. Typically, after the piercing member accesses the vial, the vial is inverted to withdraw the medicament from the container. Once the contents of the fluid container have drained to a level just under the outermost edge of the opening of the piercing member, no more fluid will be able to drain from the fluid container unless the piercing member is withdrawn slightly. Thus, often times the last few drops of the medicament (which may be very expensive and/or toxic) are not fully removed from the container, which results in waste and requires cleaning/disposal of the container. If the piercing member is retracted through the sealing member of the container to remove the remaining medicament in the container, toxic drug or medicament may leak out and contaminate the surrounding environment during such a procedure and non-filtered air containing undesirable particles such as dust, pollen, or bacteria may be drawn into the piercing member and contaminate the medicament therein. Accordingly, many conventional devices will be locked to the container or vial after the piercing member fully enters the vial. In some cases, containers are provided with an extra amount of the drug that is to be withdrawn to allow for the fact that not all of the drug will be withdrawn from the container. A user is then able to withdraw the recommended number of doses from the container, but doing so will increase the cost of each container of medical fluid, increase waste, and make cleaning or disposal of the container more complex. As sealing members are available in a wide variety of configurations, sizes, and thicknesses, designing a spike that is suitable for use with a plurality of different sealing members while optimizing the use of the drug in the vial in a safe and convenient manner is difficult.

SUMMARY OF THE INVENTION

In one aspect, a vial adapter includes a body having a component connection interface and a vial connection interface, with the component connection interface configured to engage a connection interface of a mating component, a pressure equalization assembly including a chamber configured to expand from a first volume to a second volume larger than the first volume, and a piercing member having a first end connected to the body and a second end positioned opposite the first end. The piercing member and the body define a fluid passageway and a pressure equalization passageway. The fluid passageway is in fluid communication with the component connection interface, the pressure equalization passageway is in fluid communication with the chamber of the pressure equalization assembly, and the piercing member defines first and second fluid ports in fluid communication with the fluid passageway and a pressure equalization port in fluid communication with the pressure equalization passageway. The second end of the piercing member includes a piercing point configured to pierce a closure of a vial, with the first and second fluid ports extending from a position intermediate the first and second ends of the piercing member to the second end of the piercing member. The first and second fluid ports and a portion of the piercing member define a V-shaped profile at the second end of the piercing member.

An open end of the V-shaped profile may face a radially outward direction relative to the piercing member. A bottom of the V-shaped profile may intersect with the piercing point of the piercing member. The first fluid port may be separated from the second fluid port by a partition wall positioned at the second end of the piercing member. A portion of the partition wall may be recessed radially inward relative to an outer surface of the piercing member. The first and second fluid ports may be configured to direct fluid radially outward relative to the piercing member. The first and second fluid ports may be elongate with a largest dimension of the first and second fluid ports extending in a direction from the first end of the piercing member to the second end of the piercing member. The first and second fluid ports may be configured to withdraw at least 98% of fluid from a vial. The first and second fluid ports may be configured to withdraw between 98% and 99.2% of fluid from a vial.

In a further aspect, a vial adapter includes a body having a component connection interface and a vial connection interface, with the component connection interface configured to engage a connection interface of a mating component, a pressure equalization assembly including a chamber configured to expand from a first volume to a second volume larger than the first volume, and a piercing member having a first end connected to the body and a second end positioned opposite the first end, with the piercing member and the body defining a fluid passageway and a pressure equalization passageway. The fluid passageway is in fluid communication with the component connection interface and the pressure equalization passageway is in fluid communication with the chamber of the pressure equalization assembly. The piercing member defines first and second fluid ports in fluid communication with the fluid passageway and a pressure equalization port in fluid communication with the pressure equalization passageway. The second end of the piercing member includes a piercing point configured to pierce a closure of a vial, with the first and second fluid ports extending from a position intermediate the first and second ends of the piercing member to the second end of the piercing member. The first and second fluid ports are configured to withdraw at least 98% of fluid from a vial.

The first and second fluid ports may be configured to withdraw between 98% and 99.2% of fluid from a vial. The first and second fluid ports and a portion of the piercing member may define a V-shaped profile at the second end of the piercing member. An open end of the V-shaped profile may face a radially outward direction relative to the piercing member. A bottom of the V-shaped profile may intersect with the piercing point of the piercing member. The first fluid port may be separated from the second fluid port by a partition wall positioned at the second end of the piercing member. A portion of the partition wall may be recessed radially inward relative to an outer surface of the piercing member. The first and second fluid ports may be configured to direct fluid radially outward relative to the piercing member. The first and second fluid ports may be elongate with a largest dimension of the first and second fluid ports extending in a direction from the first end of the piercing member to the second end of the piercing member. The vial adapter may further include a retractable sleeve receiving at least a portion of the piercing member. The retractable sleeve may extend from the first end of the piercing member to the second end of the piercing member.

In a further aspect, a vial adapter includes a body having a component connection interface and a vial connection interface, with the component connection interface configured to engage a connection interface of a mating component, a pressure equalization assembly including a chamber configured to expand from a first volume to a second volume larger than the first volume, and a piercing member having a first end connected to the body and a second end positioned opposite the first end, with the piercing member and the body defining a fluid passageway and a pressure equalization passageway. The fluid passageway is in fluid communication with the component connection interface, and the pressure equalization passageway is in fluid communication with the chamber of the pressure equalization assembly. The piercing member defines first and second fluid ports in fluid communication with the fluid passageway and a pressure equalization port in fluid communication with the pressure equalization passageway. The second end of the piercing member includes a piercing point configured to pierce a closure of a vial, with the first and second fluid ports extending from a position intermediate the first and second ends of the piercing member to the second end of the piercing member. The first and second fluid ports are configured to withdraw at least 98% of fluid from the vial adapter and a vial connected to the vial adapter.

In another aspect, a vial adapter includes a body having a component connection interface and a vial connection interface, with the component connection interface configured to engage a connection interface of a mating component, a pressure equalization assembly including a chamber configured to expand from a first volume to a second volume larger than the first volume, and a piercing member having a first end connected to the body and a second end positioned opposite the first end, with the piercing member and the body defining a fluid passageway and a pressure equalization passageway. The fluid passageway is in fluid communication with the component connection interface, the pressure equalization passageway is in fluid communication with the chamber of the pressure equalization assembly, and the piercing member defines first and second fluid ports in fluid communication with the fluid passageway and a pressure equalization port in fluid communication with the pressure equalization passageway. The second end of the piercing member includes a piercing point configured to pierce a closure of a vial, with the first and second fluid ports extending from a position intermediate the first and second ends of the piercing member to the second end of the piercing member. The first fluid port is separated from the second fluid port by a partition wall positioned at the second end of the piercing member, with the piercing member defining a first cutting edge extending from the first fluid port to the piercing point and a second cutting edge extending from the second fluid port to the piercing point. The first and second cutting edges are spaced from the partition wall.

The first cutting edge may be spaced from the partition wall by a first planar portion and the second cutting edge is spaced from the partition wall by a second planar portion. The first and second planar portions may form a V-shaped profile. The partition wall may include a pointed end aligned with the piercing point in a direction extending along a longitudinal axis of the piercing member. The partition wall adjacent to the pointed end may be rounded.

DETAILED DESCRIPTION

Figure 1:
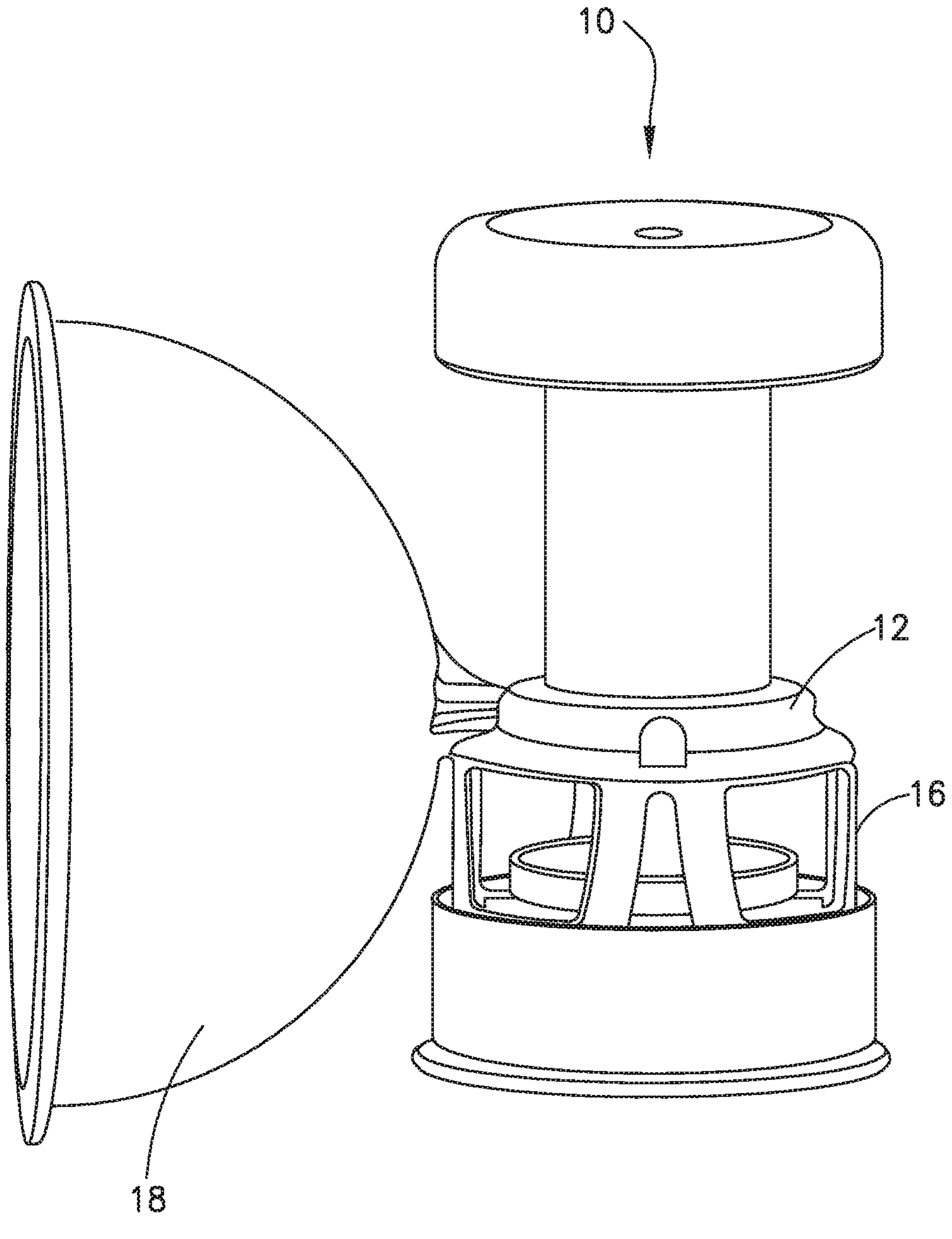
FIG. 1 is perspective view of a vial adapter according to one aspect of the present invention.
Figure 2:
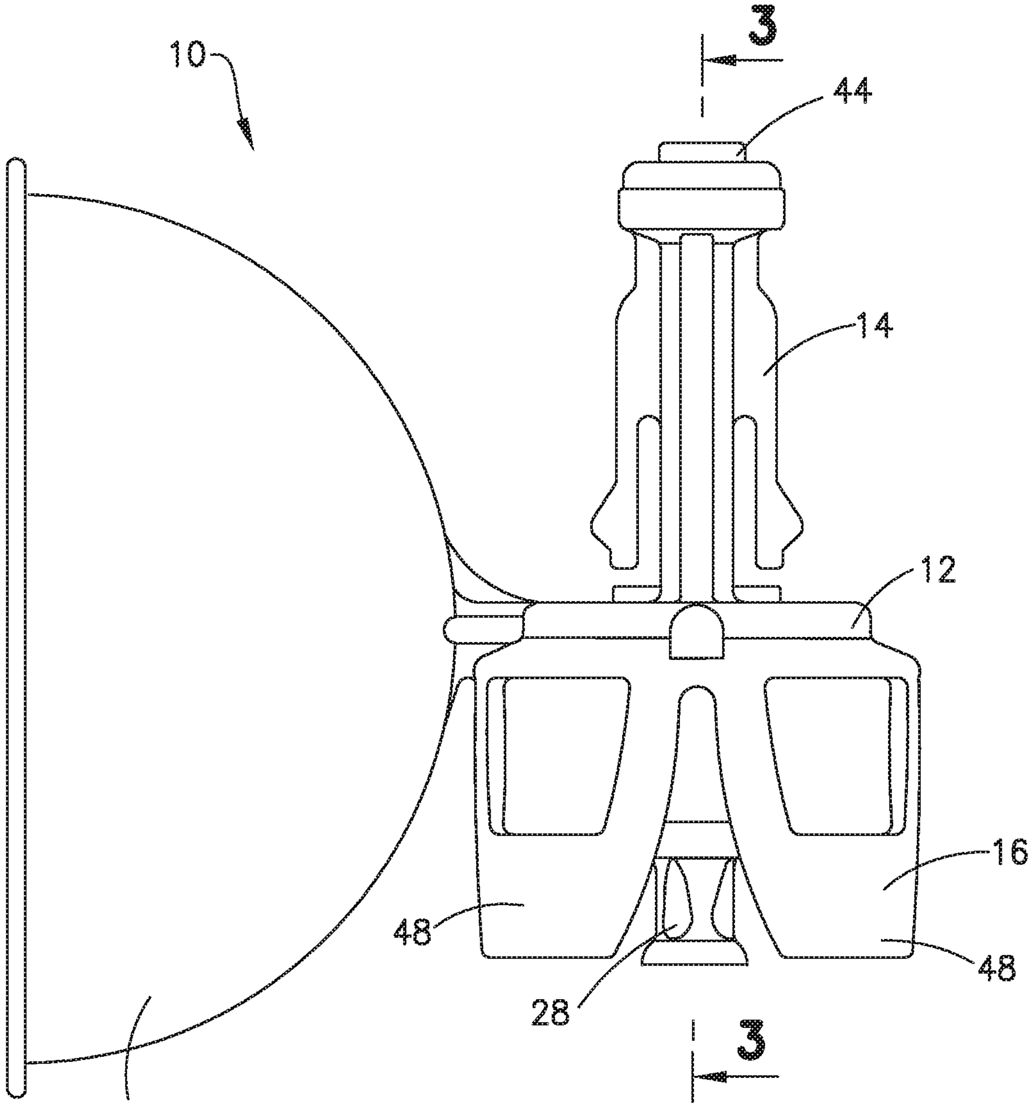
FIG. 2 is a front view of the vial adapter of FIG. 1.
Figure 3:
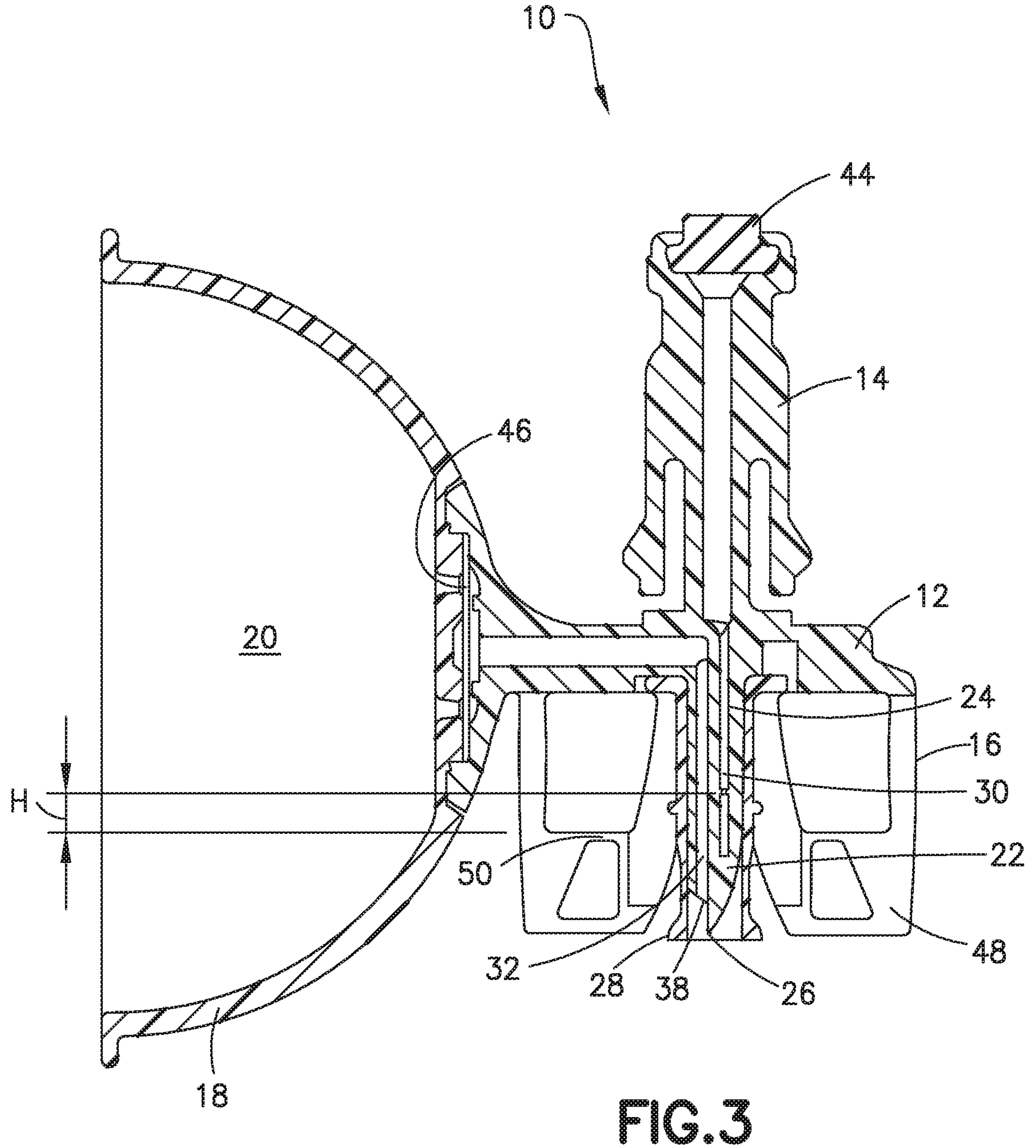
FIG. 3 is a cross-sectional view of the vial adapter taken along line 3-3 in FIG. 2.
Figure 4:
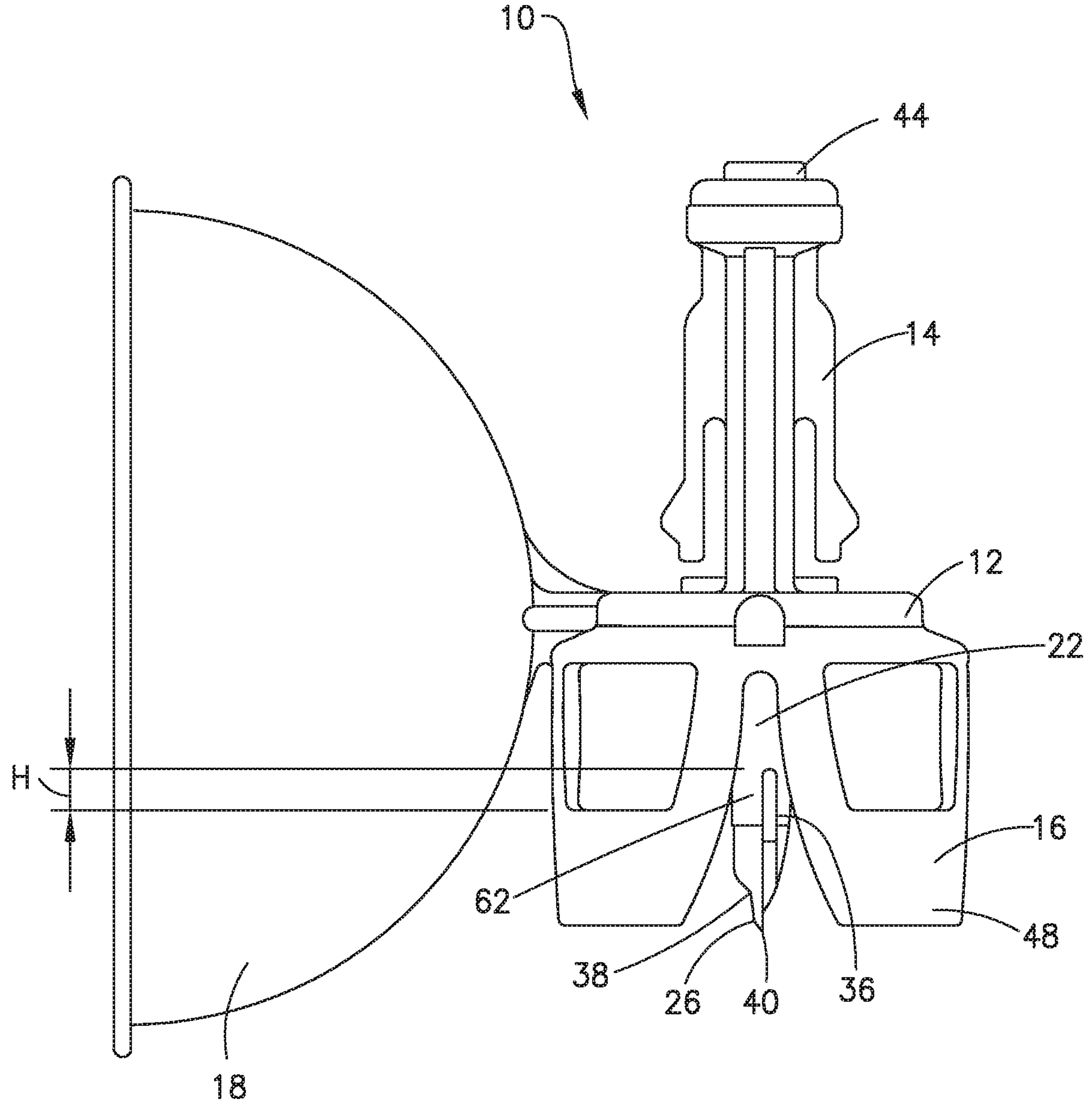
FIG. 4 is a front view of the vial adapter of FIG. 1, showing a piercing member.
Figure 5:
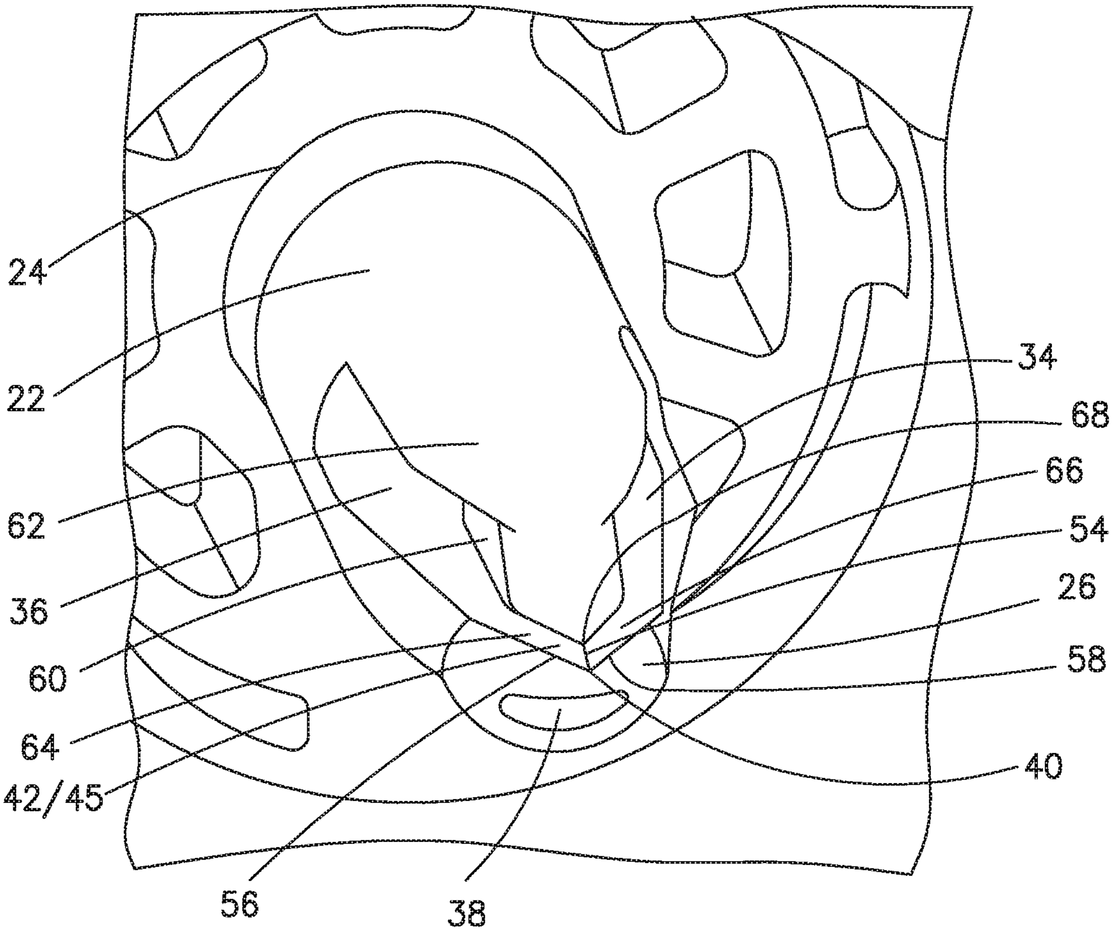
FIG. 5 is a partial left bottom perspective view of the vial adapter of FIG. 1, showing a piercing member.
Figure 6:
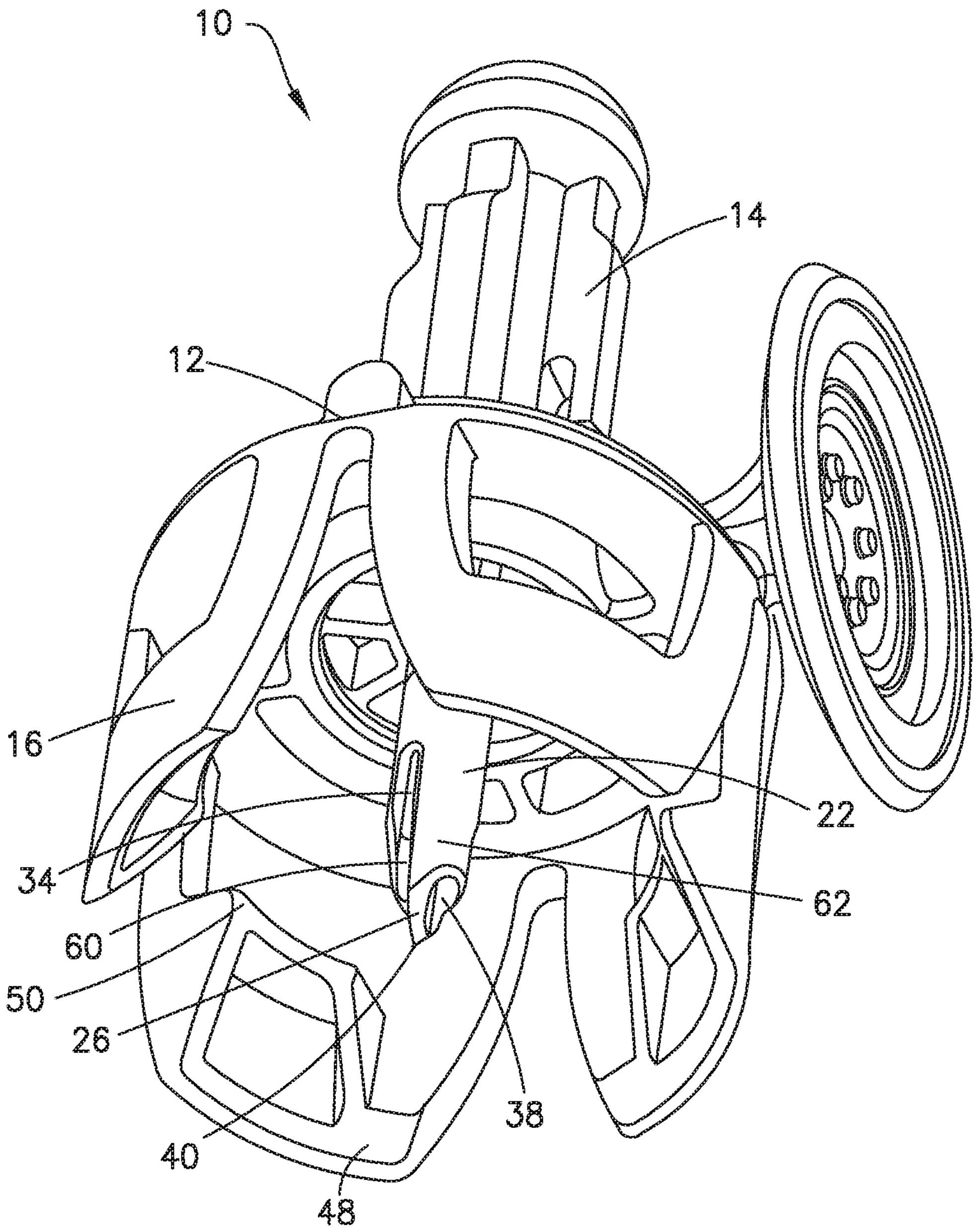
FIG. 6 is aback bottom perspective view of the vial adapter of FIG. 1, showing a piercing member.
Figure 7:
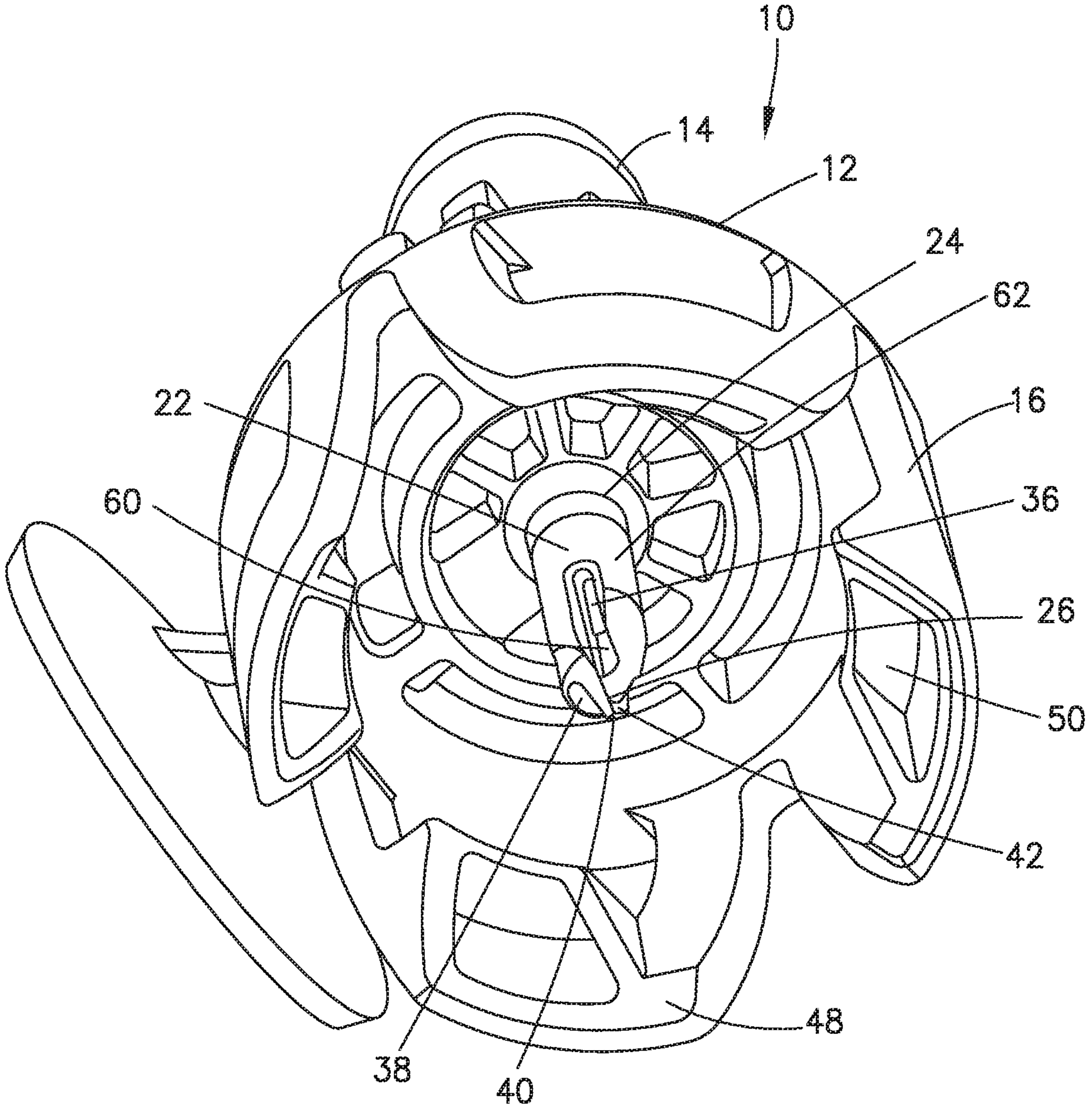
FIG. 7 is a front bottom perspective view of the vial adapter of FIG. 1, showing a piercing member.
Figure 8:
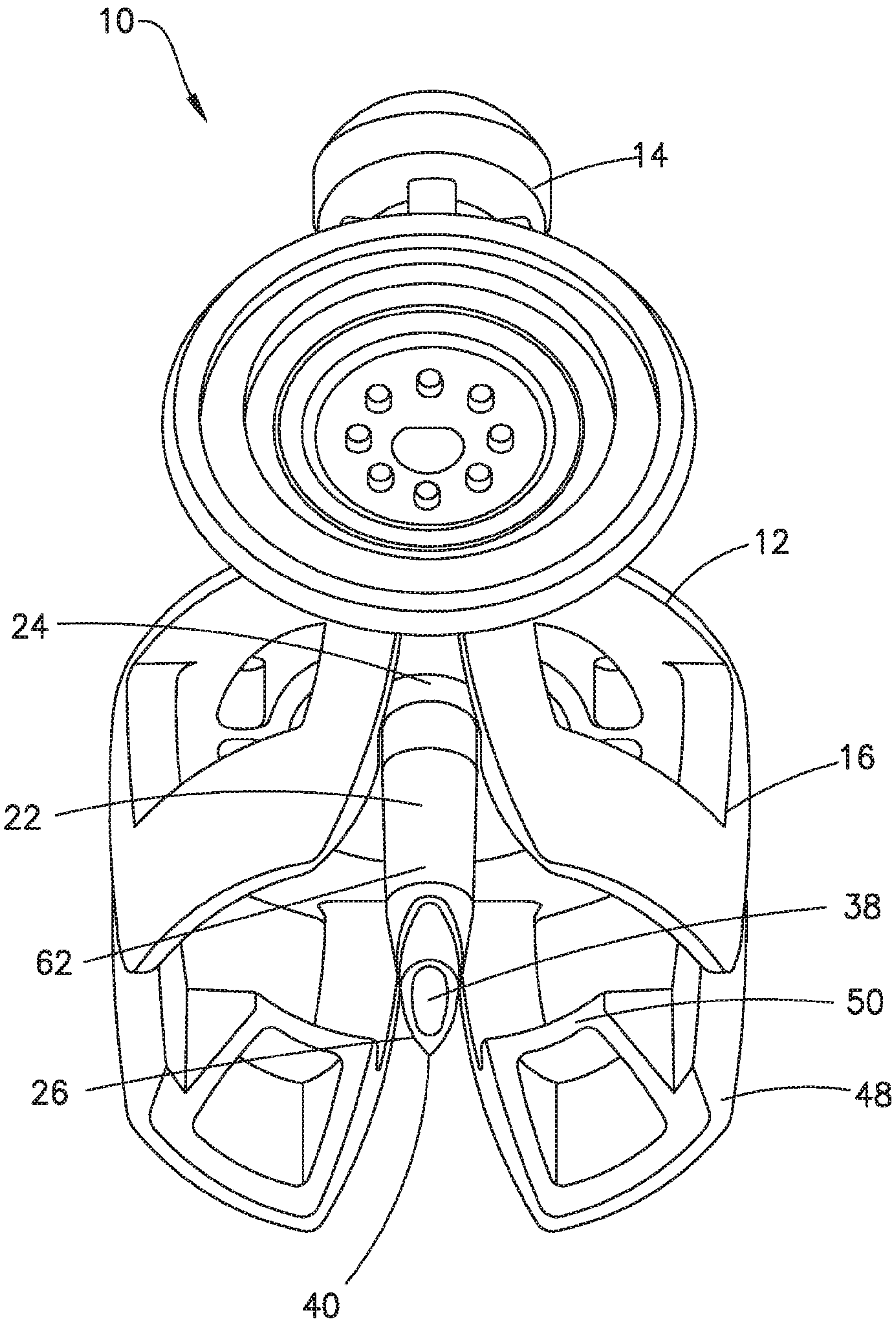
FIG. 8 is a right bottom perspective view of the vial adapter of FIG. 1, showing a piercing member.
Figure 9:
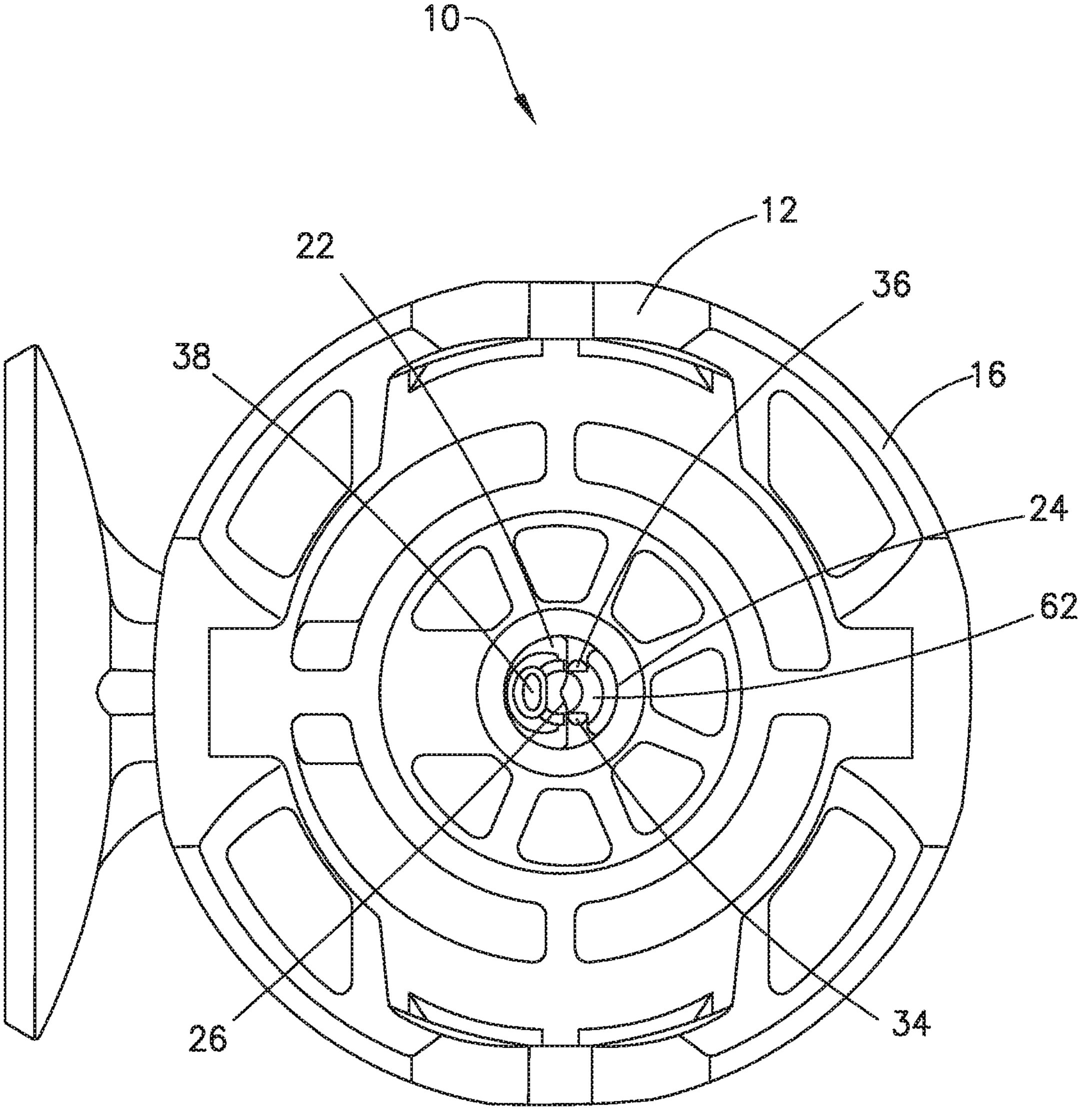
FIG. 9 is a bottom view of the vial adapter of FIG. 1, showing a piercing member.

For purposes of the description hereinafter, the terms such as "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

Referring to FIGS. 1-9, a vial adapter 10 includes a body 12 having a component connection interface 14 and a vial connection interface 16, a pressure equalization assembly 18 including a chamber 20 configured to expand from a first volume to a second volume larger than the first volume, and a piercing member 22 having a first end 24 connected to the body 12 and a second end 26 positioned opposite the first end 24. The vial adapter 10 is configured to transfer fluid from a fluid container (not shown) having a sealing member. The fluid container may include, but is not limited to, a vial, a bottle, and a bag such as an infusion bag.

In one aspect, the vial adapter 10 includes a retractable sleeve 28 surrounding the piercing member 22. The retractable sleeve 28 may extend from the first end 24 of the piercing member 22 to the second end 26 of the piercing member 22. The retractable sleeve 28 is configured to retract upon engagement of the retractable sleeve 28 with a vial and to prevent the escape of any fluids or vapors during attachment of the vial adapter 10 to a vial. The retractable sleeve 28 may be the same as the retractable sleeve 28 shown and described in U.S. Pat. No. 9,919,826, which is hereby incorporated by reference in its entirety. The vial adapter 10, however, may utilize any other suitable sleeve arrangement. The retractable sleeve 28 is not shown in FIGS. 4-9 for the sake of clarity regarding the piercing member 22.

Figure 11:
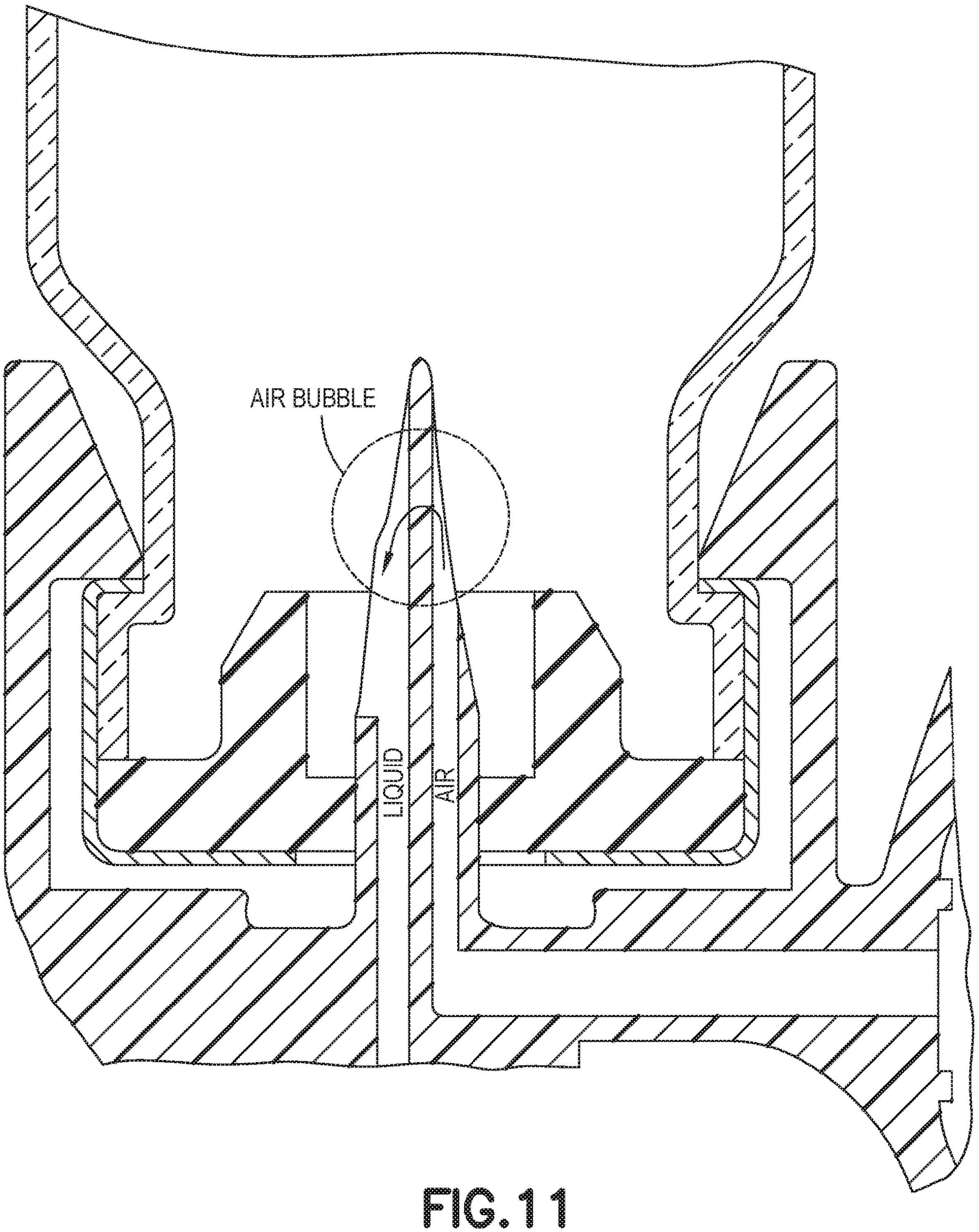
FIG. 11 PRIOR ART
FIG. 11 is a partial cross-sectional view of a conventional vial adapter of FIG. 1, showing possible air bubble bridging.

Referring to FIGS. 3-9 and 11, the piercing member 22 and the body 12 define a fluid passageway 30 and a pressure equalization passageway 32, with the fluid passageway 30 in fluid communication with the component connection interface 14 and the pressure equalization passageway 32 in fluid communication with the chamber 20 of the pressure equalization assembly 18. The piercing member 22 defines first and second fluid ports 34, 36 in fluid communication with the fluid passageway 30 and a pressure equalization port 38 in fluid communication with the pressure equalization passageway 32. The second end 26 of the piercing member 22 includes a piercing point 40 configured to pierce a closure of a vial. The first and second fluid ports 34, 36 extend from a position intermediate the first and second ends 24, 26 of the piercing member 22 to the second end 26 of the piercing member 22. As discussed in more detail below, the first and second fluid ports 34, 36 and a portion of the piercing member 22 define a V-shaped profile 42 at the second end 26 of the piercing member 22. As shown in FIG. 11, with conventional vial adapters, there is the possibility of an air bubble bridging between the fluid port and the vent/pressure equalization port, which may result in the inability to withdraw fluid from the vial because only air would be drawn into the syringe via the pressure equalization volume. In contrast, with the vial adapter 10, at least a portion of the pressure equalization port 38 is positioned closer to the piercing point 40 than any portion of the first and second fluid ports 34, 36, which minimizes the potential for any air bubbled bridging between the fluid passageway 30 and the pressure equalization passageway 32.

Referring again to FIGS. 1-6, the component connection interface 14 is configured to engage a connection interface of a mating component, such as a syringe adapter. The component connection interface 14 may be the same as the connection interface shown and described in U.S. application Ser. No. 15/871,330 filed on Jan. 15, 2018, which is hereby incorporated by reference in its entirety. The vial adapter 10, however, may utilize any other suitable connection interface. The fluid passageway 30, discussed above, extends through the component connection interface 14. The component connection interface 14 includes a membrane 44 to seal the fluid passageway 30 and to facilitate the closed transfer of fluid utilizing the vial adapter 10.

Referring to FIGS. 1-5, the pressure equalization assembly 18 is configured to equalize the pressure within a vial during fluid transfer by the use of the pressure equalization port 38, the pressure equalization passageway 32, and the chamber 20 of the pressure equalization assembly 18. The pressure equalization passageway 32 is in fluid communication with the chamber 20 such that air or fluid introduced into a vial using the vial adapter 10 will displace the air within the vial and expand the chamber 20 from the first volume to the second volume. In particular, during use of the vial adapter 10, the pressure equalization assembly 18 is utilized to regulate the pressure within a vial and contain the medicament and any vapor thereof within the vial adapter 10 and within the vial. The pressure equalization assembly 18 may be the balloon or membrane arrangement shown in U.S. Pat. No. 8,523,838, which is hereby incorporated by reference in its entirety, although other suitable pressure equalization arrangements may be utilized, such as, but not limited to, a filtered vent exit. Further, the pressure equalization assembly 18 may include a filter 46, such as a hydrophobic filter, positioned between the chamber 20 and the pressure equalization passageway 32. The fluid passageway 30 and the pressure equalization passageway 32 may have any suitable cross-section including, but not limited to, round, oval, elliptical, semi-circular, and square.

Referring to FIGS. 1-9, the vial connection interface 16 is configured to secure the vial adapter 10 to a container, such as a vial. The vial connection interface 16 includes a plurality of resilient arms 48 having protrusions 50 that engage the rim of the fluid container when the piercing member 22 has been pushed through the sealing member of the fluid container, although other suitable arrangements for the vial connection interface 16 may be utilized. The size of the vial adapter 10 and the vial connection interface 16 will vary depending the size of the vial. In one aspect, the vial adapter 10 has a specific size and dimensions for each vial size, such as a 13 mm vial, 20 mm vial, 28 mm vial, 32 mm, etc. The resilient arms 48 deflect radially outward when the vial adapter 10 is in the process of being attached to a fluid container and return to their original position after being fully secured to the container.

Referring to FIGS. 4-9, the V-shaped profile 42 of the piercing member 22 includes an open end 52 and a bottom 54. The V-shaped profile 42 defines first and second cutting edges 56, 58 to facilitate the piercing of the sealing member of the container. The V-shaped profile 52 and the cutting edges 56, 58 minimize coring and fragmentation of the sealing member as the piercing member 22 pierces the sealing member. The open end 52 of the V-shaped profile 42 faces a radially outward direction relative to the piercing member 22. The bottom 54 of the V-shaped profile 42 intersects with the piercing point 40 of the piercing member 22. The bottom 54 of the V-shaped profile 42 defines a fillet, although other suitable configurations may be utilized. The V-shaped profile 42 of the piercing member 22 is configured to aid in the piercing of the sealing member of the vial and to aid in directing fluid toward the first and second fluid ports 34, 36 to maximize the amount of fluid able to be withdrawn from a vial. The first fluid port 34 is separated from the second fluid port 36 by a partition wall 60 positioned at the second end 26 of the piercing member 22. The partition wall 60 is planar, although other suitable shapes and configurations may be utilized. A portion of the partition wall 60 is recessed radially inward relative to an outer surface 62 of the piercing member 22. A portion of the partition wall 60 is flush with the outer surface 62 of the piercing member 22 adjacent to the second end 26 of the piercing member 22. The transition between the V-shaped profile 42 and the partition wall 60 is filleted, although other suitable transitions may be utilized. The piercing member 22 may be circular in cross-section, although other suitable shapes and configurations may be utilized. The first and second cutting edges 56, 58 extend to the piercing point 40 with the first and second cutting edges 56, 58 being spaced from the partition wall 60. The first cutting edge 56 is spaced from the partition wall 60 by a first planar portion 64. The second cutting edge 58 is spaced from the partition wall 60 by a second planar portion 66. The first and second planar portions form at least a portion of the V-shaped profile 42. The partition wall 60 includes a pointed end 68 aligned with the piercing point 40 in a direction extending along a longitudinal axis of the piercing member 22. A portion of the partition wall 60 adjacent to the pointed end is rounded.

Figure 10B:
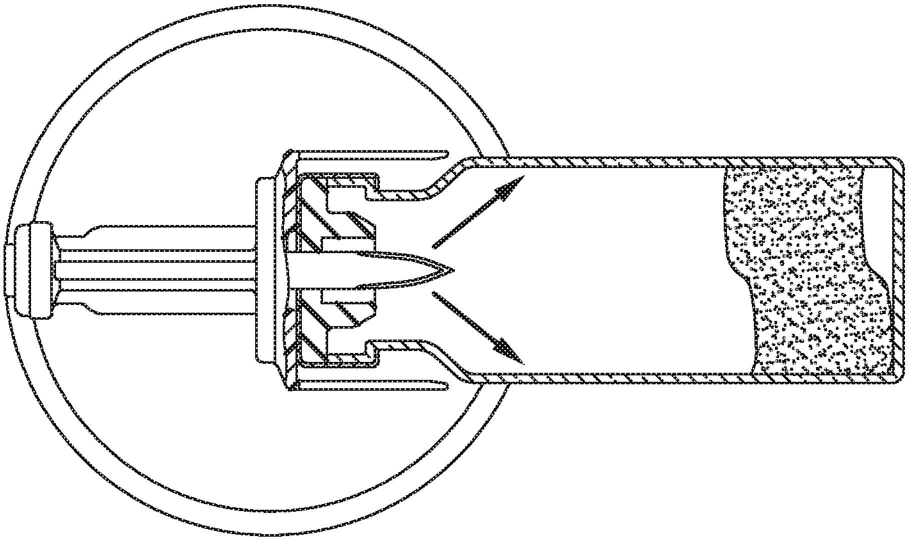
FIG. 10B is a left side view of the vial adapter of FIG. 1, showing a fluid flow direction.
Figure 10A:
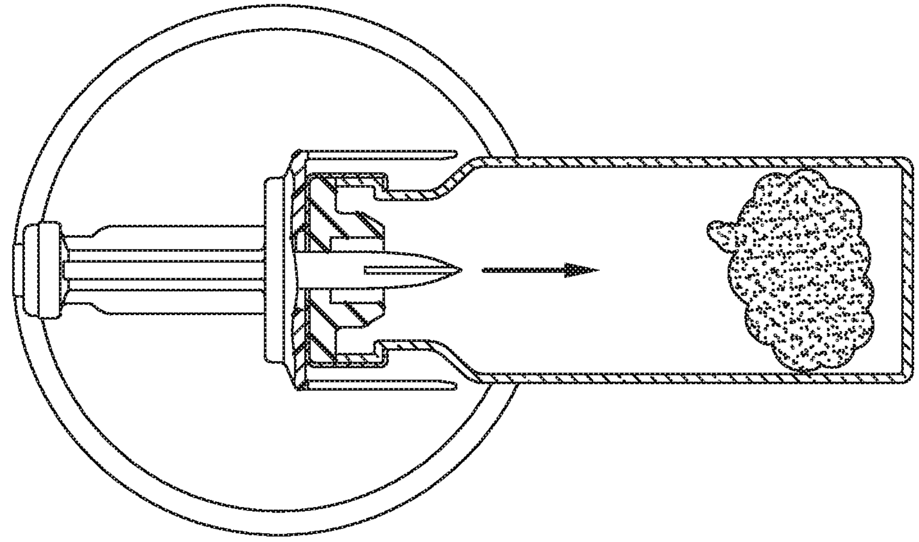
FIG. 10A PRIOR ART
FIG. 10A is a left side view of a conventional vial adapter, showing a fluid flow direction.

The first and second fluid ports 34, 36 are configured to direct fluid radially outward relative to the piercing member 22. In particular, fluid from a syringe (not shown) that is connected to the component connection interface 14 via a syringe adapter (not shown) passes through the fluid passageway 30 and radially outward through the first and second fluid ports 34, 36 and onto the walls of the container. As shown in FIG. 10A, in conventional vial adapters, the fluid is directed downwards, which can cause foaming and bubbles to form due to the turbulent action of the fluid thereby requiring a waiting period prior to further use of the vial contents. As shown in FIG. 10B, the first and second fluid ports 34, 36 are configured to direct fluid onto the walls of the container rather than flow down toward the bottom of the container. Such a configuration prevents the liquid from forcefully hitting powdered medication and producing disturbed air bubbles that may require additional time to dissipate prior to further use of the adapter 10.

Referring again to FIGS. 4-9, the first and second fluid ports 34, 36 are elongate with a largest dimension of the first and second fluid ports 34, 36 extending in a direction from the first end 24 of the piercing member 22 to the second end 26 of the piercing member 22. The first and second fluid ports 34, 36 may extend for about 50% of a length of the piercing member 22, although other suitable configurations may be utilized. The first fluid port 34 extends along a first axis and the second fluid port 36 extends along a second axis, with the first axis configured to intersect with the second axis. In other words, the first and second fluid ports 34, 36 each taper radially inward as the piercing member 22 tapers in a direction extending from the first end 24 of the piercing member 22 toward the second end 26 of the piercing member 22. The distance H from the top of the first and second fluid ports 34, 36 to the top of the protrusions 50 of the vial connection interface 16 is selected to minimize drug loss within a vial during withdrawal utilizing the vial adapter 10. In particular, due to the shape and configuration of the piercing member 22 and the first and second fluid ports 34, 36 as well as the distance H, the vial adapter 10 is configured to withdrawal almost all of the fluid within a container thereby minimizing drug loss and waste. In one aspect, the first and second fluid ports 34, 36 are configured to withdraw at least 98% of fluid from a vial. In a further aspect, the first and second fluid ports 34, 36 are configured to withdraw between 98% and 99.2% of fluid from a vial. In another aspect, the first and second fluid ports 34, 36 are configured to withdrawal between 97.4% and 99.16% of fluid from a vial. In one aspect, the first and second fluid ports 34, 36 are configured to withdraw 98.3% of fluid from a vial.

In one example, the vial adapter 10 was tested to determine the residual drug loss utilizing the vial adapter 10 in connection with a syringe and syringe adapter to withdrawal fluid from a vial. 20 ml glass drug vials were filled with 10 ml of deionized water. The weight of the filled vial, the vial adapter 10, and syringe/syringe adapter were recorded. The water in the vial was withdrawn by inverting the vial and utilizing the vial adapter 10, syringe adapter, and syringe. All of the components were weighed after fluid withdrawal to calculate the residual water left in the vial. Ten samples were tested to determine the residual fluid loss. For the sample size (N=10), utilizing the vial adapter 10 to withdraw the fluid resulted in an average residual fluid loss in a vial of 0.1701 ml, a maximum fluid loss in a vial of 0.2524, and a minimum fluid loss in a vial of 0.0838. For the same test, the vial adapter 10 and the vial together as a system had an average residual fluid loss together of 0.1870 ml, a maximum fluid loss of the vial adapter 10 and the vial of 0.2662 ml, and a minimum fluid loss of the vial adapter 10 and the vial of 0.0987 ml.

While certain exemplary embodiments of the present invention have been shown and described herein with reference to certain preferred embodiments thereof, it will be understood by those skilled in the art that various changes in form and details may be made therein without departing from the spirit and scope of the invention.

The invention claimed is:

1. A vial adapter comprising:

a body having a component connection interface and a vial connection interface, the component connection interface configured to engage a connection interface of a mating component;

a pressure equalization assembly including a chamber configured to expand from a first volume to a second volume larger than the first volume; and a piercing member having a first end connected to the body and a second end positioned opposite the first end, the piercing member and the body defining a fluid passageway and a pressure equalization passageway, the fluid passageway is in fluid communication with the component connection interface, the pressure equalization passageway is in fluid communication with the chamber of the pressure equalization assembly, the piercing member defining first and second fluid ports in fluid communication with the fluid passageway and a pressure equalization port in fluid communication with the pressure equalization passageway, the second end of the piercing member includes a piercing point configured to pierce a closure of a vial, the first and second fluid ports extending from a position intermediate the first and second ends of the piercing member to the second end of the piercing member, the first fluid port, the second fluid port, and a portion of the piercing member in combination defining a V-shaped profile at the second end of the piercing member that directs fluid into the first and second fluid ports.

2. The vial adapter of claim 1, wherein an open end of the V-shaped profile faces a radially outward direction relative to the piercing member.

3. The vial adapter of claim 2, wherein a bottom of the V-shaped profile intersects with the piercing point of the piercing member.

4. The vial adapter of claim 1, wherein the first fluid port is separated from the second fluid port by a partition wall positioned at the second end of the piercing member.

5. The vial adapter of claim 4, wherein a portion of the partition wall is recessed radially inward relative to an outer surface of the piercing member.

6. The vial adapter of claim 4, wherein the first and second fluid ports are configured to direct fluid radially outward relative to the piercing member.

7. The vial adapter of claim 4, wherein the first and second fluid ports are elongate with a largest dimension of the first and second fluid ports extending in a direction from the first end of the piercing member to the second end of the piercing member.

8. The vial adapter of claim 1, wherein the first fluid port extends along a first axis and the second fluid port extends along a second axis, with the first axis configured to intersect with the second axis, such that the first fluid port and the second fluid port taper radially inward in order to maximize an amount of fluid that is withdrawn from the vial.

9. A vial adapter comprising:

a body having a component connection interface and a vial connection interface, the component connection interface configured to engage a connection interface of a mating component;

a pressure equalization assembly including a chamber configured to expand from a first volume to a second volume larger than the first volume; and a piercing member having a first end connected to the body and a second end positioned opposite the first end, the piercing member and the body defining a fluid passageway and a pressure equalization passageway, the fluid passageway is in fluid communication with the component connection interface, the pressure equalization passageway is in fluid communication with the chamber of the pressure equalization assembly, the piercing member defining first and second fluid ports in fluid communication with the fluid passageway and a pressure equalization port in fluid communication with the pressure equalization passageway, the second end of the piercing member includes a piercing point configured to pierce a closure of a vial, the first and second fluid ports extending from a position intermediate the first and second ends of the piercing member to the second end of the piercing member, wherein the first and second fluid ports are elongate with a largest dimension of the first and second fluid ports extending in a direction from the first end of the piercing member to the second end of the piercing member, and the first fluid port extends along a first axis and the second fluid port extends along a second axis, with the first axis configured to intersect with the second axis, such that the first fluid port and the second fluid port taper radially inward in order to maximize an amount of fluid that is withdrawn from the vial.

10. The vial adapter of claim 9, wherein the first fluid port, the second fluid port, and a portion of the piercing member define a V-shaped profile at the second end of the piercing member.

11. The vial adapter of claim 10, wherein an open end of the V-shaped profile faces a radially outward direction relative to the piercing member.

12. The vial adapter of claim 11, wherein a bottom of the V-shaped profile intersects with the piercing point of the piercing member.

13. The vial adapter of claim 9, wherein the first fluid port is separated from the second fluid port by a partition wall positioned at the second end of the piercing member.

14. The vial adapter of claim 13, wherein a portion of the partition wall is recessed radially inward relative to an outer surface of the piercing member.

15. The vial adapter of claim 13, wherein the first and second fluid ports are configured to direct fluid radially outward relative to the piercing member.

16. The vial adapter of claim 9, further comprising a retractable sleeve receiving at least a portion of the piercing member.

17. The vial adapter of claim 16, wherein the retractable sleeve extends from the first end of the piercing member to the second end of the piercing member.

18. A vial adapter assembly comprising:

a vial adapter according to claim 9; and a vial connected to the vial adapter.

19. A vial adapter comprising:

a body having a component connection interface and a vial connection interface, the component connection interface configured to engage a connection interface of a mating component;

a pressure equalization assembly including a chamber configured to expand from a first volume to a second volume larger than the first volume; and a piercing member having a first end connected to the body and a second end positioned opposite the first end, the piercing member and the body defining a fluid passageway and a pressure equalization passageway, the fluid passageway is in fluid communication with the component connection interface, the pressure equalization passageway is in fluid communication with the chamber of the pressure equalization assembly, the piercing member defining first and second fluid ports in fluid communication with the fluid passageway and a pressure equalization port in fluid communication with the pressure equalization passageway, the second end of the piercing member includes a piercing point configured to pierce a closure of a vial, the first and second fluid ports extending from a position intermediate the first and second ends of the piercing member to the second end of the piercing member, wherein the first fluid port is separated from the second fluid port by a partition wall positioned at the second end of the piercing member, the piercing member defining a first cutting edge extending from the first fluid port to the piercing point and a second cutting edge extending from the second fluid port to the piercing point, the first and second cutting edges spaced from the partition wall.

20. The vial adapter of claim 19, wherein the first cutting edge is spaced from the partition wall by a first planar portion and the second cutting edge is spaced from the partition wall by a second planar portion.

21. The vial adapter of claim 20, wherein the first and second planar portions form a V-shaped profile.

22. The vial adapter of claim 20, wherein the partition wall includes a pointed end aligned with the piercing point in a direction extending along a longitudinal axis of the piercing member.

23. The vial adapter of claim 22, wherein the partition wall adjacent to the pointed end is rounded.

* * * * *